United States Patent [19]

Bosshard

[11] Patent Number: 4,788,030
[45] Date of Patent: Nov. 29, 1988

[54] STORAGE RACK FOR NUCLEAR FUEL ELEMENTS

[75] Inventor: Ernst Bosshard, Winterthur, Switzerland

[73] Assignee: Sulzer Brothers Limited, Winterthur, Switzerland

[21] Appl. No.: 55,425

[22] Filed: May 28, 1987

[30] Foreign Application Priority Data

Jun. 2, 1986 [CH] Switzerland ............... 02229/86

[51] Int. Cl.⁴ .............................................. G21C 19/40
[52] U.S. Cl. ................................................. 376/272
[58] Field of Search ..................... 376/272; 250/506.1, 250/507.1

[56] References Cited

U.S. PATENT DOCUMENTS

| | | | |
|---|---|---|---|
| 3,859,533 | 1/1975 | Suvanto ........................... | 376/272 |
| 4,006,362 | 2/1977 | Mollen et al. ..................... | 376/272 |
| 4,088,897 | 5/1978 | Soot ................................. | 376/272 |
| 4,119,859 | 10/1978 | Karzmar et al. .................. | 376/272 |
| 4,203,038 | 5/1980 | Takahashi et al. ................ | 376/272 |

FOREIGN PATENT DOCUMENTS

| | | | |
|---|---|---|---|
| 0109461 | 5/1984 | European Pat. Off. ............ | 376/272 |
| 2730850 | 1/1979 | Fed. Rep. of Germany ...... | 376/272 |
| 2742736 | 4/1979 | Fed. Rep. of Germany ...... | 376/272 |
| 2753468 | 5/1979 | Fed. Rep. of Germany ...... | 376/272 |
| 3221810 | 12/1983 | Fed. Rep. of Germany ...... | 376/272 |

Primary Examiner—Charles T. Jordan
Assistant Examiner—Daniel Wasil
Attorney, Agent, or Firm—Kenyon & Kenyon

[57] ABSTRACT

The vertical tubes of the storage rack are spaced apart by spacer strips which are welded to the tubes and which define seal-tight chambers which are filled with neutron-absorbing material. Individual covers are used to close each chamber and to permit ready access to the chambers for changing the neutron-absorbing materials. The spacer strips may be in the form of flat strips, angle strips, cruciform strips and bars. Each tube may also be made of a pair of angle plates which are welded to the base plate of the rack.

5 Claims, 3 Drawing Sheets

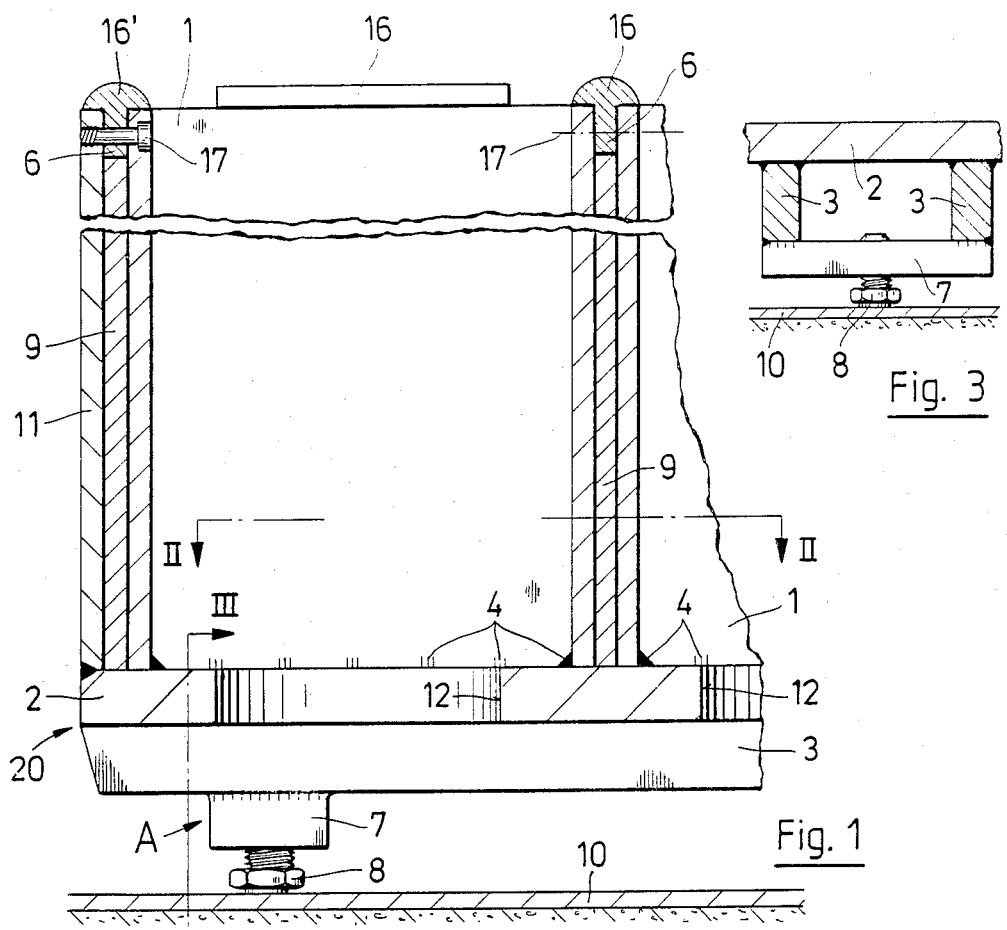
Fig. 1
Fig. 3
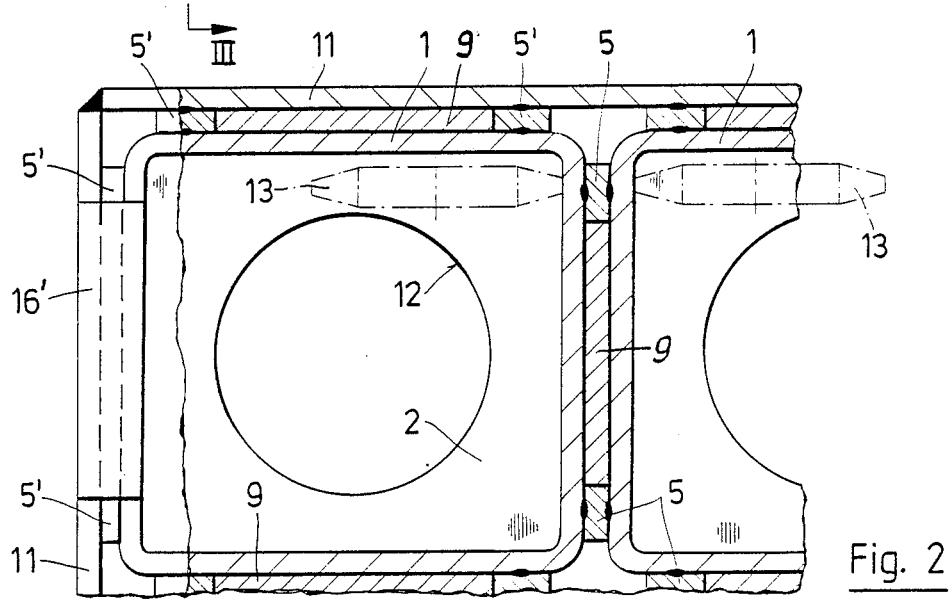
Fig. 2

STORAGE RACK FOR NUCLEAR FUEL ELEMENTS

This invention relates to a storage rack for nuclear fuel elements.

Heretofore, various types of storage racks have been known for housing nuclear fuel elements. For example, U.S. Pat. No. 3,859,533 describes a storage rack having a rectangular baseplate and a plurality of four-sided or edged tubes which are attached to the baseplate for receiving fuel elements. As described, the tubes are arranged in rows parallel to the sides of the rectangular baseplate with water-tight spaces between the mutually adjacent tubes being filled with neutron-absorbing material. Further, the baseplate is in the form of a grating with each point of intersection between bars of the grating lying at the center of a tube. The lower edges of the tubes also rest in notches in the bars and the whole array of tubes is embraced by a wall bearing on the outer tubes and resting on the grating.

In this known construction, the spaces filled with neutron-absorbing material extend only between the tubes, intersecting over the entire length and breadth of the baseplate. Further, these spaces are rendered water-tight by welds which extend along the upper and lower margins and by means of a cover plate engaging over the entire rack.

Racks of the above type usually stand in groups one beside the other in large water-filled ponds or tanks with both the racks and the fuel elements therein being completely immersed in the water.

However, racks of the above type have several disadvantages. For example, the tubes of a rack are not mechanically supported over their height, a factor which reduces the earthquake resistance of a rack. In this respect, the neutron-absorbing material which fills the spaces between the tubes cannot transmit forces. Another disadvantage is that any changing of the neutron-absorbing material involves considerable expense. This is because the cover plate must first be removed and then the welds at the upper margins of the tubes must be cut off.

Accordingly, it is an object of the invention to provide an improved storage rack construction for nuclear fuel elements.

It is another object of the invention to increase the earthquake resistance of a storage rack for nuclear fuel elements.

It is another object of the invention to be able to change the neutron-absorbing material in a storage rack in a relatively easy manner.

Briefly, the invention provides a storage rack for nuclear fuel elements which comprises a baseplate, a plurality of vertically disposed four-sided tubes secured to the baseplate in parallel rows and in spaced apart relation to each other, a plurality of spacer strips secured between and to the tubes to laterally define a seal-tight chamber between each pair of adjacent tubes for receiving neutron-absorbing material and a plurality of covers releaseably attached to the tubes and the strips to sealingly close the chambers.

Because the spaces between the tubes are divided into chambers by the spacer strips, the spacer strips are utilized for mutual mechanical support for the tubes to ensure that the rack is earthquake resistant. Further, as each chamber has a cover, there is no need for a cumbersome cover plate engaging over the entire rack. This simplifies both construction of the rack and changing of the neutron-absorbing material since only the releaseable covers have to be removed from the chambers. Further, there is no need to remove welds.

The baseplate may comprise either plate-like elements which are perforated to admit water or grating-like elements. In the latter case, care must be taken to ensure that the bars of the grating are in line with the chambers.

The neutron-absorbing material may be any suitable material having a higher neutron-absorption than the material from which the tubes are made. For example, boron/aluminum alloys may be used as the neutron absorbing material.

These and other objects and advantages of the invention will become more apparent from the following detailed description taken in conjunction with the accompanying drawings wherein:

FIG. 1 illustrates a vertical sectional view through a part of a rack constructed in accordance with the invention;

FIG. 2 illustrates a view taken on line II—II of FIG. 1;

FIG. 3 illustrates a detail A taken on line III—III of FIG. 1;

Figure 5:
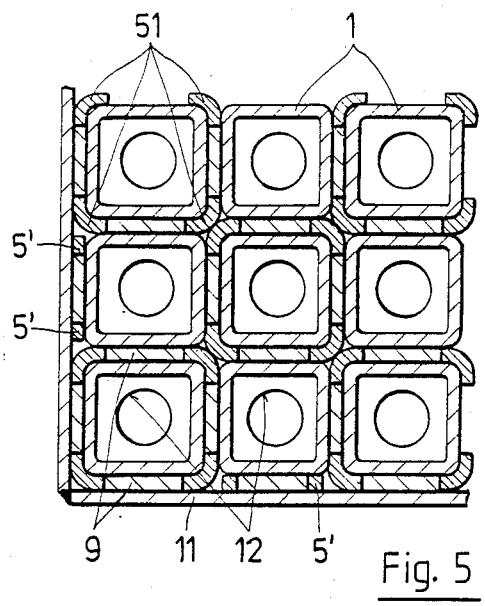
FIG. 5 illustrates a view similar to FIG. 4 of a further modified rack in accordance with the invention.

Referring to FIGS. 1 and 2, the storage rack has a base plate 20 of rectangular shape which is formed of a metal plate 2 and reinforcing ribs 3 which are welded to the underside of the plate 2 (see FIG. 3). The rack also includes a plurality of vertically disposed four-sided tubes 1 which are secured to the baseplate 20 for receiving fuel elements therein. As indicated, the tubes 1 are arranged in rows parallel to the rectangular sides of the baseplate 20 and are attached at the lower margins by welds 4 to the flat metal plate 2. Further, the tubes 1 are disposed in spaced apart relation to each other. Because the tubes 1 are arranged in rows, the spaces between the tubes 1 extend parallel to the rectangular sides of the baseplate 20.

Referring to FIG. 2, a pair of spacer strips 5 are secured between and to each pair of adjacent tubes 1 in order to laterally define a seal-tight chamber between the tubes 1 for receiving neutron-absorbing material 9. A cover 16 (see FIG. 1) is also releaseably attached at the top of the tubes 1 to sealingly close each chamber. Thus, each chamber is defined at the bottom by the metal plate 2, at the sides by two spacer strips 5 and at the top by a cover 16.

Referring to FIG. 2, the spacer strips 5 are welded in a fluid-tight manner to the adjoining parallel walls of two tubes 1, for example, by means of two electrode wheels 13. As indicated, each strip runs close to the vertical edges of the two mutually adjoining tubes 1.

Referring to FIG. 1, each cover 16 has a projection 6 which penetrates into a space between two of the strips 5. In this respect, the projection 6 has the same thickness as the spacer strips 5 and is of a length equal to the distance between the two spacer strips defining a given chamber. The remaining cross-section of the cover 16 engages over the upper end faces of the adjacent tubes 1. As indicated, each cover 16 is attached in fluid-tight manner by horizontal bolts 17 which pass through the projection 6. Each bolt 17 has a head with a hexagon socket sunk into one wall of a tube and a threaded portion which is threaded into the wall of the opposite tube. The bolt 17 also has a smooth section which rests with a close fit in a corresponding bore in the projection 6.

The rack also includes a retaining wall 11 which emcompasses the tubes 1 in spaced relation and which rests by way of a lower margin on the flat metal plate 2 to which the wall 11 is welded in a fluid-tight manner. As indicated in FIGS. 1 and 2, the distance between the retaining wall 11 and the adjacent tubes 1 is the same as that between the mutually adjoining parallel walls of the tubes 1. As above, the space between the retaining wall 11 and the tubes 1 is also divided into chambers by means of spacer strips 5'. As shown, a pair of spacer strips 5' are disposed between the wall and each adjacent tube 1 to laterally define a seal-tight chamber therebetween for receiving neutron absorbing material. Also, as above, each chamber is closed at the top by a cover 16' of the same construction as the cover 16. The fluid-tight attachment of the covers 16' is also similar in that bolts 17 are threaded into the retaining wall 11.

The neutron-absorbing material 9 which is used in the rack may, for example, be in the form of a sintered boron/aluminum sheet.

The base plate 20 is also provided with bores 12 with each bore 12 being coaxial with a tube 1 as indicated in FIG. 2.

When in use, the storage rack is set up in a water-filled storage pond or tank, only the bottom 10 of which is shown in FIGS. 1 and 3. In order to adjust the height of the rack, bridge members 7 are welded to the underside of the reinforcing ribs 3 to receive set screws 8 which rest on the pond bottom 10.

Normally, the dimensions of the storage rack are such that the rack is easy to transport and erect. A storage pond usually contains a plurality of racks disposed in side-by-side relation.

In order to assemble the described rack, the baseplate 20 is first welded together from the parts 2, 3, 7. Thereafter, the retaining wall 11 is welded to the margin of the metal plate 2. When assembled to this extent, the rack is set in a still empty pond and leveled by means of the set screws 8. The tubes 1 are then placed on the baseplate 20 and the spacer strips 5, 5' are put in position between the tubes 1 and between the tubes and the retaining wall 11. Next, the tubes 1 are welded from inside to the baseplate 20 by means of the welds 4 (see FIG. 1). The spacer strips 5, 5' are also welded to the tubes 1, preferably by a pressure welding method, for example, by means of electrode wheels 13 (see FIG. 2). The neutron-absorbing sheets 9 are then pushed into the chambers and the covers 16, 16' are attached in watertight manner by means of the bolts 17. The pond can now be filled with water so that the storage rack is ready to receive nuclear fuel elements. Because of the bores 12 in the baseplate 20, the water can circulate naturally to cool the fuel elements.

Figure 4:
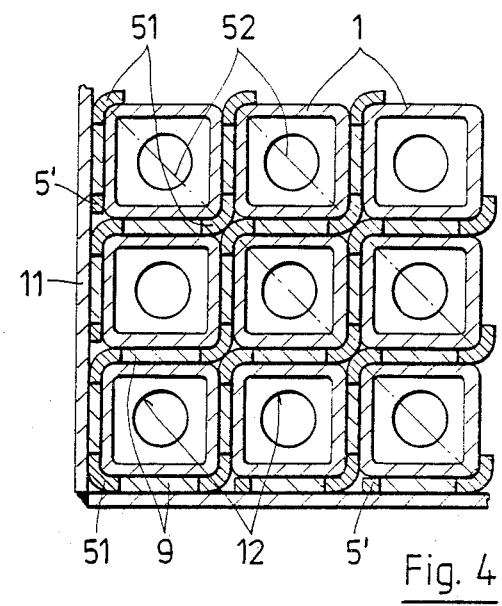
FIG. 4 illustrates a diagrammatic horizontal sectional view through a part of a modified rack employing angle section strips in accordance with the invention.

Referring to FIG. 4, wherein like reference characters indicate like parts as above, pairs of spacer strips near one edge of the tube 1 may be combined to form an angle section strip 51. As indicated, the strips 51 are disposed at two diagonally opposed edges of a respective tube 1. As illustrated, the angle strips 51 of a given tube 1 lie on the same straight line 52 as those of a tube in an adjoining row. Spacer strips 5' are also provided between the external tubes 1 and the retaining wall 11 in a manner as described above. Further, the tube at the corner of the rack may have an angle strip 51 instead of two spacer strips 5'.

Referring to FIG. 5, wherein like reference characters indicate like parts as above, angle section strips 51 may be disposed at four edges of alternating tubes in a respective row of tubes. In this way, in the manner of a checker-board, only those tubes which stand on a white or black square are provided with angle strips. In this arrangement, the tubes in the outer rows have spacer strips 5' to form water-tight chambers between these tubes and the retaining wall 11.

In both of the embodiments of FIGS. 4 and 5, the mutally contacting angle strips 51 may be welded together to increase the strength of the rack. This welding may also be performed by pressure welding, for example, via electrode wheels.

Figure 6:
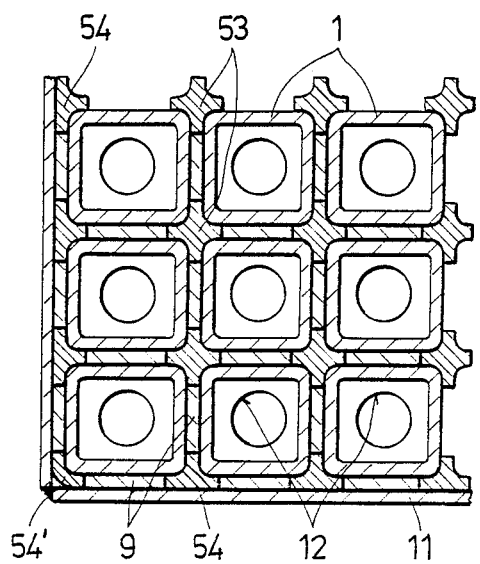
FIG. 6 illustrates a view similar to FIG. 4 of a modified rack employing strips of cruciform shape.

Referring to FIG. 6, wherein like reference characters indicate like parts as above, the rack may be formed with spacer strips 53 of cruciform shape with each strip 53 secured to each of four adjacent tubes. In this embodiment, the tubes adjoining the retaining wall 11 have bars 54 with T-shaped cross sections whereas angle strips 54' are provided at the corners of the rack.

Figure 7:
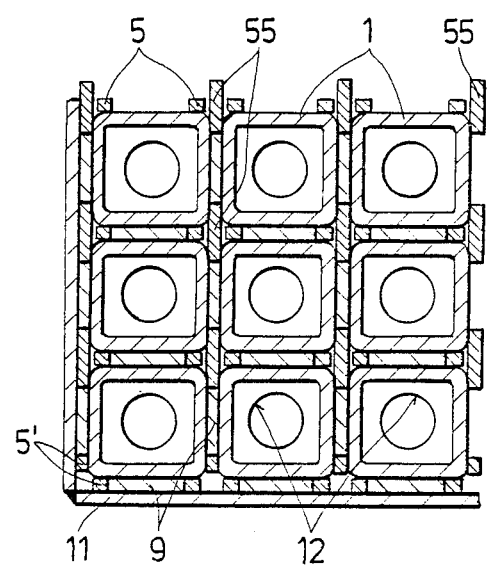
FIG. 7 illustrates a view similar to FIG. 4 of a further modified rack in accordance with the invention.

Referring to FIG. 7, wherever vertical edges of four tubes 1 meet, the spacer strips of only two mutually adjoining chambers in the same row are combined to form a bar 55 of rectangular cross section whereas the spacer strips 5 of the chambers perpendicular thereto remain unchanged.

Figure 8:
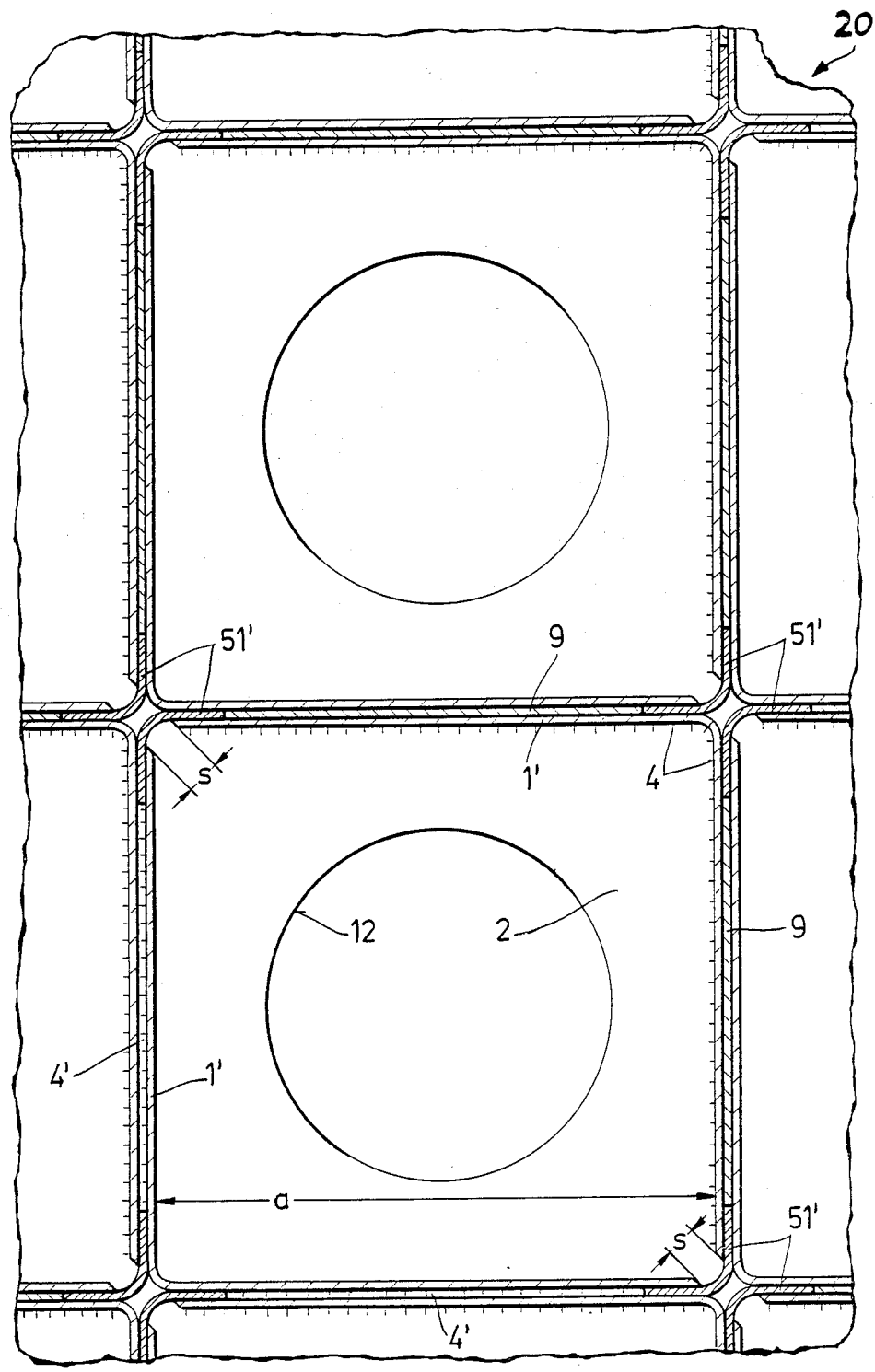
FIG. 8 illustrates a horizontal sectional view through a modified rack employing tubes made of angle plates.

Referring to FIG. 8, wherein like reference characters indicate like parts as above, each tube may be formed of a pair of bent angle plates 1', each of which is bent through 90°. In addition, the plates are disposed in spaced relation at two diagonal edges. As shown, the flange length is slightly shorter than the length a of the side of a tube. This leaves two gaps s at the two diagonally opposite edges of the tube. In addition, angle section strips 51' are disposed in bridging relation to the gaps s at the diagonal edges of the tube so as to close the tube over the entire periphery. These angle strips 51' are welded to the associated ends of the adjoining angle plates 1'.

The rack of FIG. 8 may be assembled in a different manner from that as described above. For example, first one of the bent angle plates 1' is welded from inside to the baseplate 20 via two welds 4. The second angle 1' is then placed on the baseplate 20 and welded from the outside via two welds 4'. The other tubes are then attached to the baseplate 20 in the same way. Thereafter, the angle strips 51' are pushed in and welded to the plates 1'.

The construction of FIG. 8 has a particular advantage in that the tubes can be made from relatively simple bent angle plates and angle strips. This requires fewer welds and relatively lower expenditure on precision. Welding of the angle plates 1' to the baseplate 20 can be performed by simpler means than in the embodiment illustrated in FIGS. 1 and 2 which uses closed tubes.

By way of example, the dimensions of the tubes of FIG. 8 may be, for example, side length a of 155 millimeters, a height of 4,000 millimeters and a wall thickness of 3.5 millimeters.

The neutron-absorbing material may alternatively be in the form of bars of circular, elliptical or polygonal cross-section or in powder or granular form.

The invention thus provides a storage rack for nuclear fuel elements wherein the vertically disposed tubes can be secured to each other to increase the mechanical stability and earthquake-resistants of the rack.

Further, the invention provides a storage rack which permits relatively easy access to the chambers in which the neutron-absorbing materials are contained since each chamber has its own cover which can be readily removed from time-to-time. As a result, changing of the neutron-absorbing material can be performed at reduced expense.

What is claimed is:

1. A storage rack for nuclear fuel elements comprising
    a baseplate;
    a plurality of vertically disposed tubes secured to said base plate in parallel rows for receiving fuel elements therein, each said tube being disposed in spaced apart relation to an adjacent tube and formed of a pair of bent angle plates disposed in spaced relation at two diagonal edges;
    a plurality of spacer strips secured between and to said tubes to laterally define a seal-tight chamber between each pair of adjacent tubes for receiving neutron absorbing material, each said spacer strip being disposed in bridging relation to a respective diagonal edge of a tube; and
    a plurality of covers releasably attached to said tubes to sealingly close said chambers.

2. A rack as set forth in claim 1 wherein said strips are welded to said tubes.

3. A rack as set forth in claim 1 wherein each said cover includes a projection penetrating into a space between two of said strips.

4. A rack as set forth in claim 3 which further includes a bolt passing through said projection of a respective plate into a respective tube for securing said respective cover to said respective tube.

5. A rack as set forth in claim 1 which further comprises a retaining wall encompassing said tubes in spaced relation, and a plurality of spacer strips secured between and to said wall and adjacent tubes to laterally define seal-tight chambers therebetween for receiving neutron-absorbing material.

* * * * *

UNITED STATES PATENT AND TRADEMARK OFFICE
CERTIFICATE OF CORRECTION

PATENT NO. : 4,788,030

DATED : Nov. 29, 1988

INVENTOR(S) : Ernst Bosshard

It is certified that error appears in the above-identified patent and that said Letters Patent is hereby corrected as shown below:

```
Column 3, line 56 "preferrably" should be -preferably-
Column 5, line 7 "resistants" should be -resistance-
```

Signed and Sealed this

Fifteenth Day of August, 1989

Attest:

DONALD J. QUIGG

Attesting Officer

Commissioner of Patents and Trademarks